Patented Nov. 16, 1926.

1,607,400

UNITED STATES PATENT OFFICE.

MARTIN HÖLKEN, SR., OF BARMEN, GERMANY.

PROCESS OF MAKING ARTIFICIAL SILK AND STAPLE FIBER.

No Drawing. Application filed August 26, 1921, Serial No. 495,843, and in Germany December 2, 1918.

Up to the present in the manufacture of artificial silk and staple fiber it proved impossible to obtain a product of perfect evenness; considerable differences as to elasticity, porosity, gloss and the like were ascertained among the threads spun simultaneously under equal conditions. In consequence thereof it is almost impossible to dye fabrics or yarns made of artificial silk or staple fiber right away to light or sensitive shades, because the latter, almost without any exception, turns out very different and thus become worthless.

It has often been tried to improve the evenness of the thread and all efforts possible have been made, especially with reference to the viscose solution, for the purpose of rendering the state of the chemical compound permanently uniform. These efforts, however, have not been successful. It has been found that the unevenness is not due to any irregularities in regard to the viscose solution, but to chemical phenomena, which up to the present are not cleared up as they occur during the transformation of the solution caused by the torpescence of the thread.

Doubtlessly the liquid used for the precipitation of the viscose solution as well as the substances contained therein play an important rôle. If for instance distilled water is used for precipitating, the thread shows much more evenness as if ordinary water had been used. On the other side the threads are favorably influenced by using hard water, yet it is not immaterial to which causes the hardening properties of the respective water are due.

Extensive experiments have revealed the fact that the unevenness of the threads is mainly caused by the bicarbonate of lime, which is the cause of the so-called temporary hardness of the water. When this compound is removed from the water, the still remaining quantity of lime shows a much less unfavorable influence, which can even be further reduced by suitable admixtures.

The removal of the bicarbonate of lime can be effected by any of the well known methods, for instance by adding soda, boiling, filtration by means of the column apparatus and by many other means, such methods being most successful in which no chemicals are added, so that the purification is merely effected mechanically.

As admixtures suitable for moderating the detrimental influence of the remaining lime (constant hardness) soluble organic compounds can be recommended, first of all the various kinds of sugar, which are used in the precipitating bath of the copper oxyd or viscose silk, glycerine, soluble starch and others. The favorable effect appears already if only 1/100–1/10% is added, the blue color of the precipitating liquid of the copperoxyd-ammoniac process being much more intense and the copper being thus removed much quicker and much better than without the admixtures mentioned above. The threads obtained in such a bath show much greater evenness, which is a very important feature especially for the dyeing.

I wish it to be understood that I do not desire to be limited to the exact proportions nor to the exact sequence of steps herein described for many obvious modifications will occur to a person skilled in the art.

I claim—

1. In the manufacture of artificial silk, the step of precipitation which consists in preparing a precipitating bath from hard water by mechanically softening the water so as to deprive it of its temporary hardness, then depriving it of most of its remaining constant hardness by means of an addition substance having as such no direct effect on the product precipitated in the bath, and subjecting the silk to the action of such bath.

2. In the manufacture of artificial silk, the step of precipitation which consists in preparing a precipitating bath by mechanically dehardening raw water, adding thereto a relatively very small amount of a soluble organic matter to carry the dehardening step to its optimum degree, and subjecting the silk to the action of the bath.

3. In the manufacture of artificial silk, the precipitation step which consists in subjecting the silk to the action of raw water, which has been deprived of its temporary hardness and which contains an organic substance reducing its constant hardness.

4. In the manufacture of artificial silk. the precipitating step which consists in subjecting the silk to the action of a bath of mechanically dehardening raw water to which has been added a sugar substance in an amount of a fraction of one percent of the total.

5. In the art of manufacturing artificial silk and the like, the step of precipitation whereby the beneficial effects of certain constituents of natural hard water containing lime may be secured without detrimental effects due to the presence of bicarbonate of lime in excess, which consists in preparing a precipitation bath of modified hard water by reduction of the bicarbonate of lime content causing temporary hardness to a degree in which the percentage of lime remaining and causing constant hardness will be insufficient to cause detrimental action on the silk, and then performing the precipitating action in such bath.

6. In the art of manufacturing artificial silk and the like, the step of precipitation whereby the beneficial effects of certain constituents of natural hard water containing lime may be secured without detrimental effects due to the presence of bicarbonate of lime in excess, which consists in preparing a precipitation bath of modified hard water by reduction of the bicarbonate of lime content causing temporary hardness to a degree in which the percentage of lime remaining and causing constant hardness will be insufficient to cause detrimental action on the silk, adding to the bath a soluble organic substance having the property of reducing the constant hardness of the water, and then performing the precipitating action in such bath.

7. In the art of manufacturing artificial silk and the like, the step of precipitation whereby the beneficial effects of certain constituents of natural hard water containing lime may be secured without detrimental effects due to the presence of bicarbonate of lime in excess, which consists in preparing a precipitation bath of modified hard water by reduction of the bicarbonate of lime content causing temporary hardness to a degree in which the percentage of lime remaining and causing constant hardness will be insufficient to cause detrimental action on the silk, adding to the bath a saccharin substance having the property of reducing the constant hardness of the water, and then performing the precipitating action in such bath.

In testimony whereof I affix my signature.

MARTIN HÖLKEN, Sr.